Feb. 13, 1923.

S. C. F. DOWLING.
BUSHING.
FILED MAY 8, 1920.

1,445,074.

INVENTOR
Freida A. Dowling
administratrix of the estate of Sewell C. F. Dowling
BY
Hardway Cather
ATTORNEYS.

Patented Feb. 13, 1923.

1,445,074

UNITED STATES PATENT OFFICE.

SEWELL C. F. DOWLING, DECEASED, BY FREIDA A. DOWLING, ADMINISTRATRIX, OF HOUSTON, TEXAS.

BUSHING.

Application filed May 8, 1920. Serial No. 379,785.

*To all whom it may concern:*

Be it known that I, FREIDA A. DOWLING, a citizen of the United States, residing at Houston, in the county of Harris and State of Texas, am administratrix of the estate of SEWELL C. F. DOWLING, late a citizen of the United States, deceased, who invented certain new and useful Improvements in a Bushing, of which the following is a specification.

This invention relates to new and useful improvements in a bushing.

One object of the invention is to provide a bushing which is specially designed for application to the pedal hanger of a bicycle, but may be used for other similar purposes.

Another object of the invention is to provide a bushing of the character described which has been specially designed for the purpose of repairing worn or broken pedal hangers, or cranks on a bicycle or motor cycle.

With the above and other objects in view the invention has particular relation to certain novel features of construction, and use, an example of which is given in this specification and illustrated in the accompanying drawings wherein.

Figures 1, 2, 3:
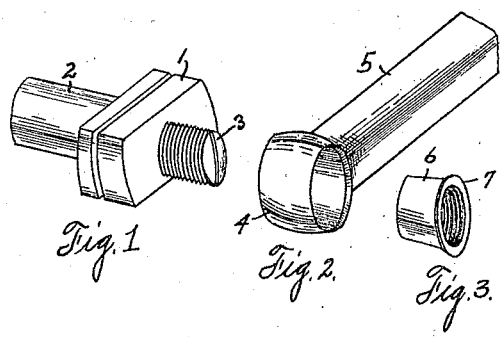
Figure 1 is a fragmentary view of the pedal of a bicycle or motor cycle.
Figure 2 is a fragmentary perspective view of the crank or hanger.
Figure 3 is a perspective view of the bushing.
Figure 4:
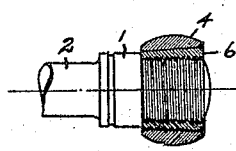
Figure 4 is a fragmentary, assembled view of the parts above referred to shown in section.

Referring now more particularly to the drawings, wherein like numerals of reference designate similar parts in each of the figures, the numeral 1 refers to the pedal which has the central supporting rod 2, one end 3 of which projects beyond the pedal and is threaded into the outer end 4 of the pedal hanger 5. The threads in this hanger often become worn out and stripped and for the purpose of repairing the same, the bushing 6 has been provided. The outer end of this bushing has an annular rim 7 and the bushing is slightly tapered and internally threaded. When the threads of the hanger become worn out or stripped it is reamed out, as shown in Figures 2 and 4 and given a taper to conform to the contour of the bushing. The bushing is then inserted through the reamed out bearing thus provided and screwed on to the end 3 of the rod 2 as shown in Figure 4. The pedal is thus secured to the hanger and the bushing forms a smooth and substantial bearing for said hanger and the parts are practically as good as new.

What I claim is:

1. The combination with a pedal hanger having a tapering bearing opening therethrough of a repair bushing conforming in contour and fitting through said bearing, said bushing being internally threaded to receive the externally threaded end of a pedal rod, and a flange carried on its outer end which projects at substantially right angles to the axis of the pedal rod and adapted to hold the pedal hanger on said pedal rod.

2. The combination with a pedal hanger having an outwardly flared bearing opening therethrough of a repair bushing, ring-like in form, conforming in contour to and fitting through said bearing, said bushing being internally threaded to receive the externally threaded end of a pedal rod.

In testimony whereof, witness my signature at Houston, Texas, this 3d day of May, A. D. 1920.

FREIDA A. DOWLING,
*Administratrix of Sewell C. F. Dowling, deceased.*

In the presence of:—
JAS. W. OLIVER,
WM. A. CATHEY.